United States Patent Office 2,708,670
Patented May 17, 1955

2,708,670

PREPARATION OF A THIADIAZOLE COMPOUND

Raymond Jacques Horclois, Malakoff, and Jean Metivier, Arpajon, France, assignors to Societe des Usines Chimiques Rhone-Poulenc, Paris, France, a body corporate of France No Drawing. Application September 23, 1953,
Serial No. 381,992

Claims priority, application France October 9, 1952

2 Claims. (Cl. 260—306.8)

This invention has for its object to provide a new and commercially useful process for the preparation of 2-amino-5-mercapto-1:3:4-thiadiazole, an important intermediate for use in organic syntheses.

One known process for the preparation of this compound (Freund and Imgart, Berichte 28, 946) involves the cyclisation of hydrazodithiocarbonamide by means of concentrated hydrochloric acid; a poor yield only is obtainable due to the simultaneous formation in substantial quantity of 2:5-diamino-1:3:4-thiadiazole. A further known process (Guha, J. A. C. S. 44, 1510) employs as starting materials thiosemicarbazide and carbon disulphide in an aqueous medium, therefore necessitating the use of an autoclave and elevated temperature (140° C.); these operating conditions, moreover, bring about reduction in yield since they favour the formation of 2:5-dimercapto-1:3:4-thiadiazole through the hydrogen sulphide liberated in the main reaction.

It is the object of this invention to provide a modification of the Guha process which avoids the aforesaid disadvantages.

The process of the present invention consists in effecting reaction between thiosemicarbazide and carbon disulphide in a reaction medium consisting of or containing a substituted or unsubstituted amide which is a liquid at the reaction temperature employed. It has been found that under these conditions the desired reaction proceeds rapidly under normal pressure at but slightly elevated temperature (temperatures of the order of 40° to 80° C. are satisfactory). Preferably the amide has a melting point below 50° C. and suitable amides are formamide and N-mono- or di-alkyl-substituted amides of lower fatty acids, such as N-methylformamide, N-methylacetamide, N-dimethylformamide and N-dimethylacetamide. The last two mentioned substances are particularly suitable. It is not essential that the reaction medium shall consist solely of the said amide; mixtures with other solvents for the the semicarbazide such as water, ethyl and methyl alcohol and dimethyl aniline also give satisfactory results.

The advantage of the process of the invention are manifest: operating at atmospheric pressure obviates the necessity for the use of an autoclave or sealed tube and the resultant elimination of the hydrogen sulphide as it is formed avoids the formation of the unwanted 2:5-dimercapto compound. Excellent yields are therefore obtainable.

The present invention is illustrated by the following examples which constitute preferred embodiments thereof.

*Example I*

273 g. of thiosemicarbazide are dissolved in 1620 cc. of dimethylformamide by heating on a water bath. After cooling the resulting solution to about 20° C., 375 cc. of carbon disulphide are added and the mixture is then heated under reflux, with stirring, on a water bath. Hydrogen sulphide is evolved copiously when the temperature of the mixture reaches 40° C. Heating under reflux is continued at about 80° C. until hydrogen sulphide is no longer evolved, which takes approximately one hour. The reaction mixture is then cooled and the excess carbon disulphide and dimethylformamide is driven off by heating, under a reduced pressure of 10 mm., on a water bath.

A solid residue of about 400 g. is obtained which may be purified in the following manner:

The residue is dissolved in 1750 cc. of 2 N caustic soda solution containing 15 g. of sodium hydrosulphite. 15 g. of decolourising charcoal is added to the solution, and after filtration, 2-amino-5-mercapto-1:3:4-thiadiazole is precipitated from the filtrate by the addition of 350 cc. of concentrated hydrochloric acid. The precipitate is filtered off, and is then washed and dried, under a pressure of 30 mm., in an oven at 50° C. until constant weight is attained. There is thus obtained 360 g. of 2-amino-5-mercapto-1:3:4-thiadiazole which is shown, by titration using excess iodine and thiosulphate solution as described by Guha, to be 99.8% pure.

*Example II*

A mixture of 3.4 g. of thiosemicarbazide, 20 cc. of N-methylacetamide (90%) and 5 cc. of carbon disulphide is heated under reflux until hydrogen sulphide is no longer evolved. This takes about 3 hours. The reaction mixture is then allowed to cool and poured into 200 cc. of distilled water. The precipitate which is formed is filtered off and dissolved in 50 cc. of normal caustic soda solution. 0.5 g. of decolourising charcoal is added to the solution, and, after filtration, 2-amino-5-mercapto-1:3:4-thiadiazole is precipitated from the filtrate by the addition of 60 cc. of normal hydrochloric acid. The precipitate formed is filtered off, washed with water, recrystallised from 100 cc. of boiling distilled water and then dried as described in Example I. There is thus obtained 2.5 g. of 2-amino-5-mercapto-1:3:4-thiadiazole which is shown, by titration, to be 99.6% pure.

We claim:

1. A process for the production of 2-amino-5-mercapto-1:3:4-thiadiazole which comprises reacting thiosemicarbazide with carbon disulphide at atmospheric pressure in a solvent medium consisting of N-dimethylformamide at a reaction temperature above the melting point of said amide.

2. A process for the production of 2-amino-5-mercapto-1:3:4-thiadiazole which comprises reacting thiosemicarbazide with carbon disulphide at atmospheric pressure in a solvent medium consisting of N-dimethylformamide at a reaction temperature of at most 80° C. and above the melting point of the said amide.

References Cited in the file of this patent

UNITED STATES PATENTS 2,450,406  Bambas _____ Nov. 5, 1945

OTHER REFERENCES

Guha, J. Am. Chem. Soc., vol. 44, p. 1510–17 (1922).

Bambas, "Heterocyclic Compounds" (Interscience), pp. 146–7 (1952).

MacArdle, "Solvents in Synthetic Org. Chem." (Van Nostrand), pp. 1–3 (1925).